United States Patent
Kim et al.

(10) Patent No.: US 8,557,337 B2
(45) Date of Patent: Oct. 15, 2013

(54) MAGNETIC CORE—CERAMIC SHELL NANOCRYSTALS AND MANUFACTURING METHOD THEREOF

(75) Inventors: Young Keun Kim, Seoul (KR); Hong Ling Liu, Henan (CN); Jun Hua Wu, Anhui (CN); Ji Hyun Min, Seoul (KR); You Song Kim, Seoul (KR)

(73) Assignee: Korea University Foundation (KR)

( * ) Notice: Subject to any disclaimer, the term of this patent is extended or adjusted under 35 U.S.C. 154(b) by 1369 days.

(21) Appl. No.: 11/969,482

(22) Filed: Jan. 4, 2008

(65) Prior Publication Data

US 2008/0210899 A1 Sep. 4, 2008

(30) Foreign Application Priority Data

Jan. 4, 2007 (KR) .............................. 2007-0000997

(51) Int. Cl.
*G11B 5/706* (2006.01)
*G11B 5/712* (2006.01)
*G01N 31/00* (2006.01)

(52) U.S. Cl.
USPC ........... 427/215; 427/127; 427/130; 427/131; 427/216; 427/212; 427/374.1; 427/379; 427/398.1

(58) Field of Classification Search
USPC ................................. 427/127, 212
See application file for complete search history.

(56) References Cited

U.S. PATENT DOCUMENTS

| | | | | |
|---|---|---|---|---|
| 4,861,733 | A | * | 8/1989 | White ................................ 501/1 |
| 5,128,169 | A | * | 7/1992 | Saita et al. ................... 427/2.27 |
| 6,962,685 | B2 | * | 11/2005 | Sun ................................ 423/632 |
| 2003/0129608 | A1 | | 7/2003 | Mirkin et al. |
| 2004/0219361 | A1 | * | 11/2004 | Cui et al. ................... 428/402.2 |
| 2005/0281884 | A1 | | 12/2005 | Adair et al. |
| 2006/0070491 | A1 | | 4/2006 | Yang et al. |

FOREIGN PATENT DOCUMENTS

| | | |
|---|---|---|
| EP | 0361797 | 4/1990 |
| JP | 02088059 | 3/1990 |
| JP | 02168971 | 6/1990 |
| WO | 2004065306 | 8/2004 |
| WO | WO2005046733 | * 5/2005 |

OTHER PUBLICATIONS

Sarda, "Kinetic study of citric acid influence on calcium phosphate bone cements as water-reducing agent" 2002 Wiley Periodicals, p. 654-659.*

Xie, "One pot synthesis of monodisperse iron nanoparticles for potential biomedical applications" 2006 Pure Appl. Chem., vol. 78 No. 5 p. 1003-1014.*

Morales "Magnetic studies of iron oxide nanoparticles coated with oleic acid and Pluronic block copolymer" 2005 Journ. of App. Phys. 97.*

(Continued)

*Primary Examiner* — Timothy Meeks
*Assistant Examiner* — Mandy Louie
(74) *Attorney, Agent, or Firm* — Grossman, Tucker, Perreault & Pfleger, PLLC

(57) ABSTRACT

Provided are magnetic core-ceramic shell (e.g., magnetite ($Fe_3O_4$) core-calcium phosphate ($Ca_3(PO_4)_2$) shell) nanocrystals with high crystallization degree, uniform size, and high chemical stability and a method for synthesizing the same. A core-shell structure is synthesized in a process of forming magnetite seeds corresponding to cores by the reduction of magnetite precursors and then, sequentially, coating the magnetite with $Ca_3(PO_4)_2$ by the reduction of $Ca_3(PO_4)_2$ precursors.

6 Claims, 7 Drawing Sheets

(56) References Cited

OTHER PUBLICATIONS

Notice of Grant dated Nov. 27, 2007 in corresponding Korean Application No. 2007-0000997.
European Search Report dated May 30, 2008 issued in European Patent Application No. 08150055.5-1215 (7 pages).
C. Liu, et al., "Reduction of sintering during annealing of FePt nanoparticles coated with iron oxide," Chemistry of Materials, vol. 17, Jan. 7, 200, pp. 620-625.
G. Balasundarm, et al., "Nanoparticles for treatment of Osteoporosis," Retrieved from Internet: URLL: http://aiche.confex.com/aiche/2005/techprogram/P26384.HTM.
Karapinar N. et al., "Magnetite seeded precipitation of phosphate," Water Research, Elsevier, Amsterdam, NL, vol. 38, No. 13, Jul. 1, 2004, pp. 3059-3066.
Database WPI Week 200458, Derwent Publications Ltd., London, GB; AN 2004-604120.
Japanese Office Action dated Mar. 29, 2011 issued in related Japanese Patent Application No. 2008000178.
Liu et al., "Reduction of Sintering during Annealing of Fe Pt Nano particles Coated with Iron Oxide" Chemistry of Materials, 2005, vol. 17, No. 3, p. 620 - 625.

* cited by examiner

MAGNETIC CORE—CERAMIC SHELL NANOCRYSTALS AND MANUFACTURING METHOD THEREOF

PRIORITY

This application claims priority under 35 U.S.C. §119(a) to an application filed in the Korean Intellectual Property Office on Jan. 4, 2007 and allocated Serial No. 2007-997, the contents of which are incorporated herein by reference.

BACKGROUND OF THE INVENTION

1. Field of the Invention

The present invention relates generally to magnetic core-ceramic shell nanocrystals and a method for synthesizing the same, and in particular, to magnetic core-ceramic shell (e.g., magnetite ($Fe_3O_4$) core-calcium phosphate ($Ca_3(PO_4)_2$) shell) nanocrystals with high crystallization degree, uniform size, and high chemical stability and a method for synthesizing the same.

2. Description of the Related Art

Magnetic nanocrystals are applicable to various fields such as high-density magnetic recorder, sensor, and catalyst owing to their possibility for chemical synthesis. Particularly, magnetite ($Fe_3O_4$) nanocrystals hold a position of importance in the field of magnetic materials owing to their own physio-chemical properties.

With recent active researches in bioscience, researches on a biomedical applicability using an excellent biocompatibility of magnetite have been widely conducted. Also, researches on a core shell structure obtained by coating magnetic nanocrystals controllable in position by the magnetic field with materials granting a specific function have been actively conducted.

Calcium phosphate ($Ca_3(PO_4)_2$), one of basic mineral components constituting a bone, is a ceramic material with excellent biocompatibility. At present, $Ca_3(PO_4)_2$ is mainly used in orthopedic surgery such as bone defect filling and oral surgery, and dental treatment. In recent years, $Ca_3(PO_4)_2$ serving as self-setting cements have been much researched. Also, because of bio-active properties, efforts have been made to apply $Ca_3(PO_4)_2$ even to DeoxyriboNucleic Acid (DNA) transfection, drug delivery, etc.

Thus, if nanocrystals are manufactured by synthesizing magnetite and calcium phosphate in a core shell structure, the nanocrystals, new nanomaterials, can have all magnetic, bio-active properties of respective materials and thus, have bifunctional properties and improved performance over the limit of unifunctional properties of nanostructures of existing individual materials.

The present invention provides bifunctional magnetic-ceramic core-shell nanocrystals and a manufacturing method thereof. Because the magnetic-ceramic core-shell nanocrystals are bio-active and changeable in position by the magnetic field, the nanocrystals are applicable to DNA transfection, drug delivery, bio-separation, bio-manipulation, bio-assaying, specific detection, etc. For this, there are specifically needed $Fe_3O_4$—$Ca_3(PO_4)_2$ core-shell nanocrystals and a manufacturing method thereof.

Further, there are needed bifunctional magnetic-ceramic core-shell nanocrystals with high crystallization degree, uniform size, and high chemical stability to enhance applicability and with both magnetic properties and ceramic properties, and a manufacturing method thereof.

SUMMARY OF THE INVENTION

An aspect of the present invention is to substantially solve at least the above problems and/or disadvantages and to provide at least the advantages below. Accordingly, an aspect of the present invention is to provide bifunctional magnetic-ceramic core-shell nanocrystals with both magnetic properties and ceramic properties and a manufacturing method thereof.

Another aspect of the present invention is to provide bifunctional magnetic-ceramic core-shell nanocrystals with high crystallization degree, uniform size, and high chemical stability and a manufacturing method thereof.

The above aspects are achieved by providing magnetic core-ceramic shell nanocrystals and a manufacturing method thereof.

According to one aspect of the present invention, there is provided a method for manufacturing bifunctional magnetic core-ceramic shell nanocrystals in a sequential process. The method is characterized in that the method includes mixing magnetic core material precursors with a reducing agent for the core material precursors; mixing the resultant with a solvent for the magnetic core material precursors and the reducing agent and forming a first mixture solution; heating the first mixture solution to a first temperature and maintaining the first mixture solution for a first time; cooling the first mixture solution to room temperature and forming magnetic core materials; mixing the magnetic core materials with ceramic shell material precursors and a reducing agent for the ceramic shell material precursors and forming a second mixture solution; heating the second mixture solution to a second temperature and maintaining the second mixture solution for a second time; and cooling the second mixture solution to room temperature and coating the magnetic core materials with the ceramic shell materials.

According to another aspect of the present invention, there is provided bifunctional magnetic core-ceramic shell nanocrystals manufactured in a sequential process. The bifunctional magnetic core-ceramic shell nanocrystals are characterized in that the process includes mixing magnetic core material precursors, a reducing agent for the magnetic core material precursors, and a solvent for the core material precursors and the reducing agent to form a first mixture solution, and heating and cooling the first mixture solution to form magnetic core materials; and mixing ceramic shell material precursors, a reducing agent for the ceramic shell material precursors, and a solvent for the ceramic shell material precursors and the reducing agent to form a second mixture solution in the same location where the magnetic core materials are formed, and heating and cooling the second mixture solution to coat the magnetic core materials with ceramic shell materials.

Further, provision of other exemplary embodiments than the above or other exemplary embodiments by the modification or addition of elements is possible.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

The present invention relates to a method for synthesizing magnetic core-ceramic shell nanocrystals, and in particular, to magnetite ($Fe_3O_4$) core-calcium phosphate ($Ca_3(PO_4)_2$) shell nanocrystals and a manufacturing method thereof.

Bifunctional $Fe_3O_4$—$Ca_3(PO_4)_2$ core-shell nanocrystals obtained by coating magnetite cores that are magnetic materials with calcium phosphate shells that are highly efficient bio-active ceramic materials are described below, for example.

All of $Fe_3O_4$—$Ca_3(PO_4)_2$, $Fe_3O_4/Ca_3(PO_4)_2$, and $Fe_3O_4@Ca_3(PO_4)_2$ are expressions of core-shell nanocrystals.

Magnetic core-ceramic shell nanostructures of the present invention is manufactured through two sequential processes:

1) manufacturing magnetite cores using a polyol preparation method, and 2) coating the magnetite cores with $Ca_3(PO_4)_2$ by the reduction of $Ca_3(PO_4)_2$.

In detail, magnetic/ceramic core/shell nanocrystals comprised of magnetite ($Fe_3O_4$) cores and $Ca_3(PO_4)_2$ shells are manufactured in a sequential manufacturing method by the reduction of appropriate precursors in the presence of a solution to which a polymer surfactant is added.

A process of synthesizing $Fe_3O_4$—$Ca_3(PO_4)_2$ nanocrystals according to the present invention is described below in detail.

Figure 1A:
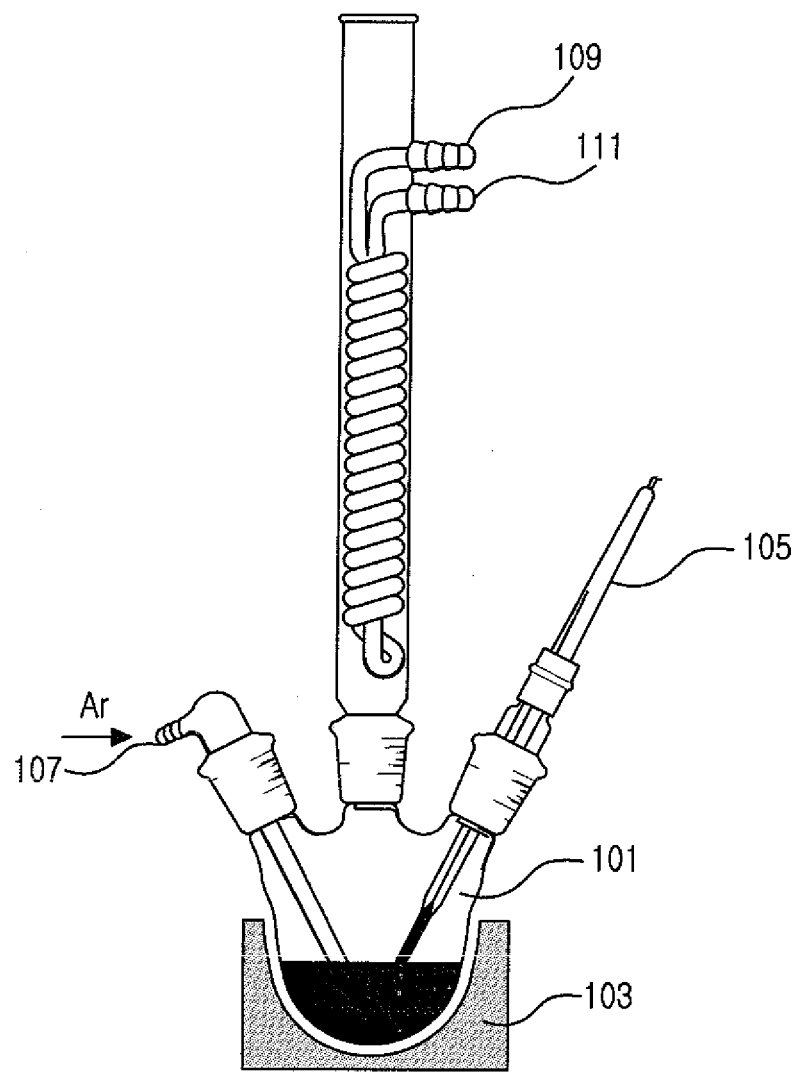
FIG. 1A is a diagram illustrating a device for synthesizing magnetic core-ceramic shell nanocrystals according to the present invention.

Referring first to FIG. 1A, an iron precursor, $Fe^{III}(acac)_3$ (ac=acetylacetonate; 0.5 mmol) (0.1766 g or 0.5 mmol), is put with reducing agent such as 1,2-hexadecanediol (0.6468 g, 2.5 mmol) in a 250 ml flask 101 through an injection unit 111 for iron oxide nanocrystals synthesis.

$Fe_3O_4$ nanocrystals are prepared by the reduction of the iron precursor that is $Fe^{III}(acac)_3$ (ac=acetylacetonate; 0.5 mmol) by hexadecanediol (0.6468 g) in the presence of polymer surfactant molecules (polyethylene oxide-co-polypropylene oxide-co-polyethylene oxide (PEO-PPO-PEO); 0.7529 g) dissolved in dioctyl ether (10 ml to 20 ml).

In the reduction process, the mixed solution is slowly heated to approximately 120° C. to 130° C. for about 1 hour and is circulated at approximately 120° C. to 130° C. for about 1 to 2 hours. After that, the mixed solution is quickly heated for about 15 minutes to about 300° C. and is circulated for about 1 to 2 hours at about 300° C. Preparation at such a high temperature is to consider refluxing. Next, the mixed solution is cooled to room temperature to prepare the magnetic core materials. In a synthesis process, a reaction mixture is heated using a heater 103. Argon gas, inertia gas, is injected through a gas injection unit 107. Gas generated during the synthesis process is exhausted through an exhaust unit 109.

After calcium acetate (3 mmol, 474.5 mg) and ammonium phosphate (2 mmol, 292.1 mg) dissolved in trioctyl phosphine (TOP, 99%; ~3 ml) are added to the solution, the reaction mixture is homogenized under magnetic stirring and then is maintained for about 2 to 3 hours. For further homogenization, the reaction mixture is heated to about 80° C. using the heater 103 and is homogenized for about 30 minutes. Temperature is measured using a thermometer 105.

$Ca_3(PO_4)_2$ is prepared by heating and maintaining the mixed solution at a temperature between 130° C. and 160° C. for about 1 to 2 hours. In a synthesis process, argon gas, inertia gas, is injected through the gas injection unit 107, and gas generated during the synthesis process is exhausted through the exhaust unit 109.

After the reaction, $Fe_3O_4$—$Ca_3(PO_4)_2$ core-shell nanocrystals are precipitated by the addition of anhydrous ethanol, usually accelerated by centrifugation and re-dispersed in hexane. This process is typically repeated twice to remove solvent molecules and other residuals from the nanocrystals.

The thus manufactured core-shell nanocrystals can be stored in a solution for a long time without quality change. This means that the core nanocrystals are densely coated with heterogeneous materials.

As the solvent, octyl ether was used rather than general phenyl ethyl. Dioctyl ether is used to prepare $FeO_x$ (a mixture of Fe and $Fe_3O_4$ among which a majority is $Fe_3O_4$) crystals as well as magnetite ($Fe_3O_4$). Further, the surfactant is not small molecular surfactants but tri-block copolymer (PEO-PPO-PEO).

Figure 1B:
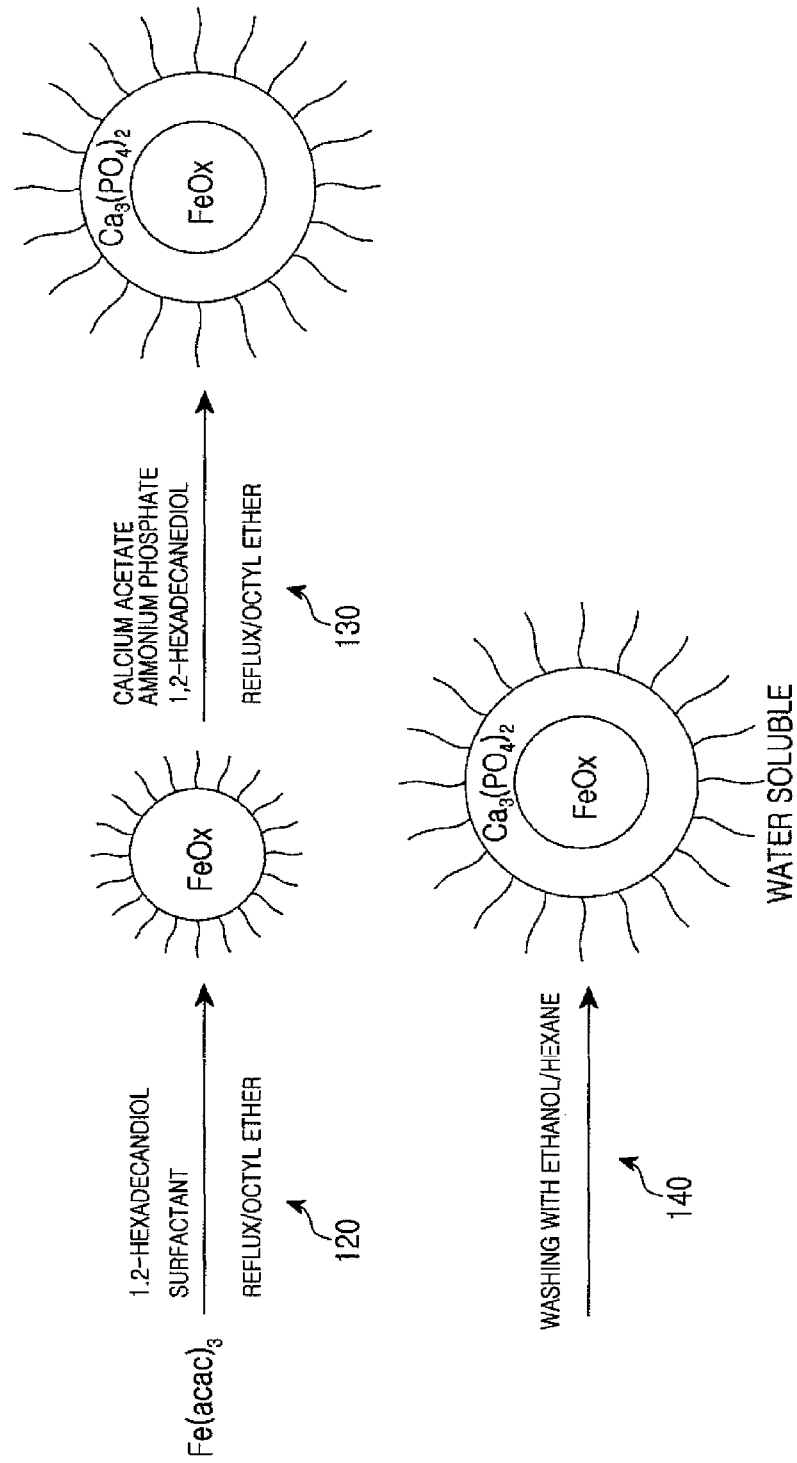
FIG. 1B is a diagram illustrating a process of synthesizing magnetic core-ceramic shell nanocrystals according to the present invention.

Referring to FIG. 1B, step 120 is a process of creating a magnetite core, step 130 is a process of coating the magnetite core with $Ca_3(PO_4)_2$, and step 140 is a process of washing the resultant with ethanol/hexane.

Figure 2A:
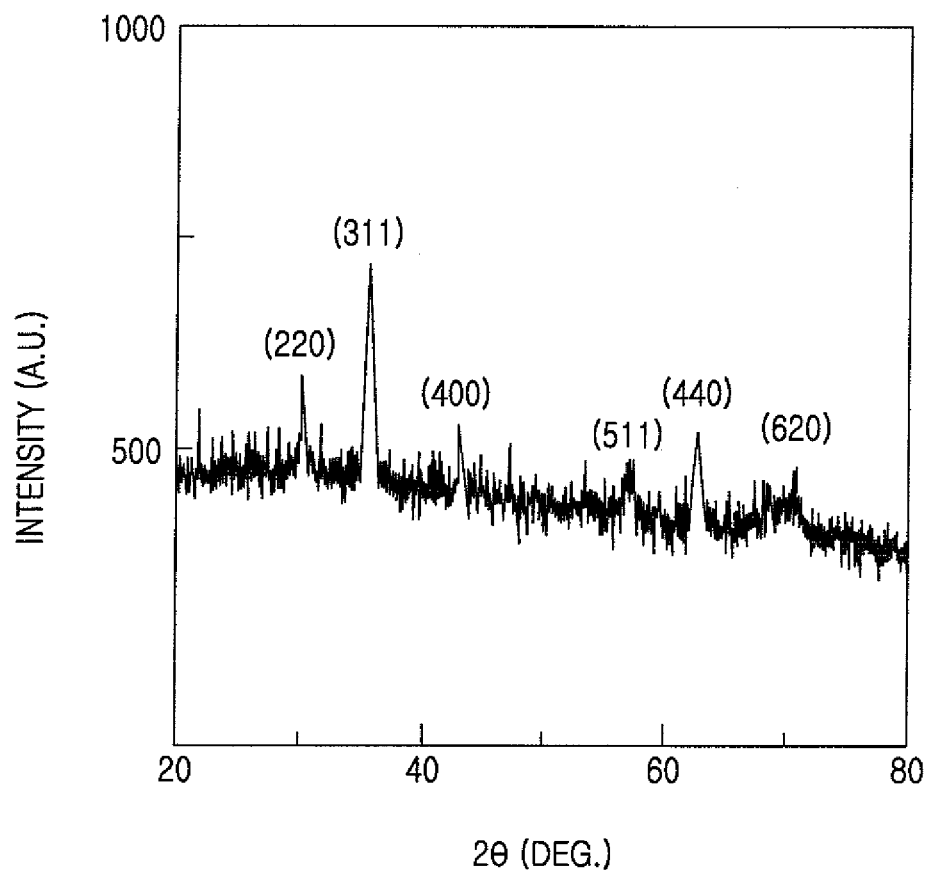
FIG. 2A is a graph illustrating an X-ray diffraction pattern for $Fe_3O_4$ core nanocrystals according to the present invention.

FIG. 2A is a graph illustrating an X-ray diffraction pattern for $Fe_3O_4$ core nanocrystals according to the present invention. In FIG. 2A, peaks mean that $Fe_3O_4$ has an inverse spinel structure.

Figure 2B:
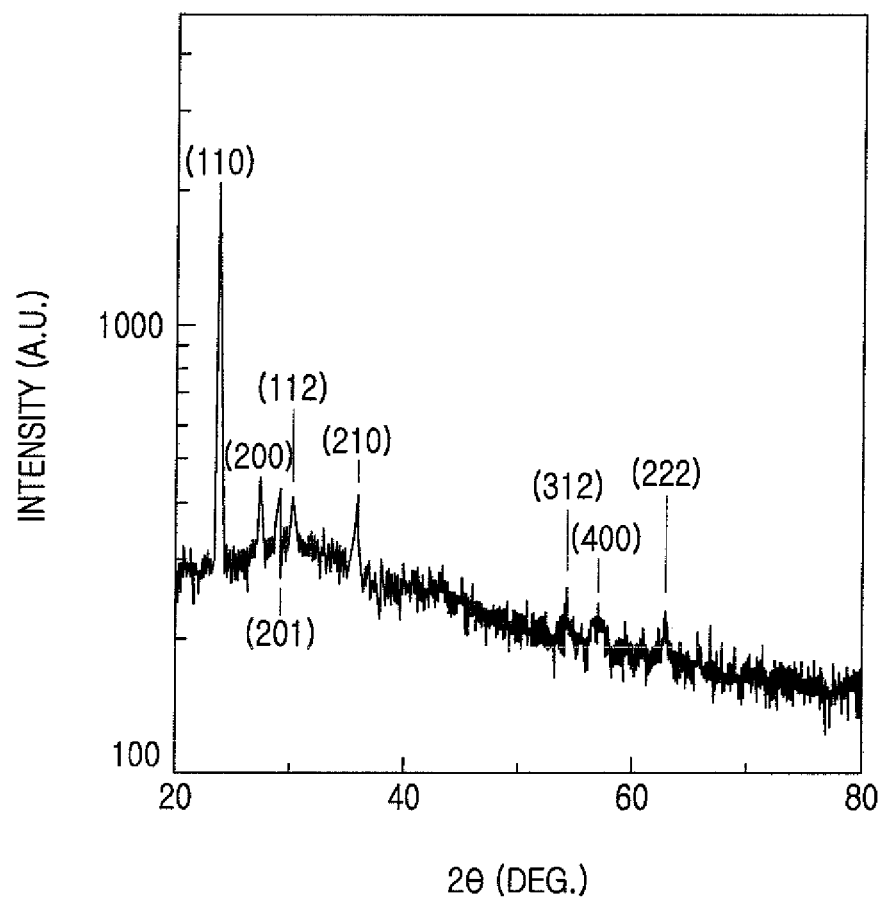
FIG. 2B is a graph illustrating an X-ray diffraction pattern for $Fe_3O_4$—$Ca_3(PO_4)_2$ core-shell nanocrystals synthesized according to the present invention.

FIG. 2B is a graph illustrating an X-ray diffraction pattern for $Fe_3O_4$—$Ca_3(PO_4)_2$ core-shell nanocrystals synthesized according to the present invention. In FIG. 2B, it can be appreciated that $Ca_3(PO_4)_2$ with high crystallization degree is in a dense hexagonal phase (hcp) structure.

Figure 3:
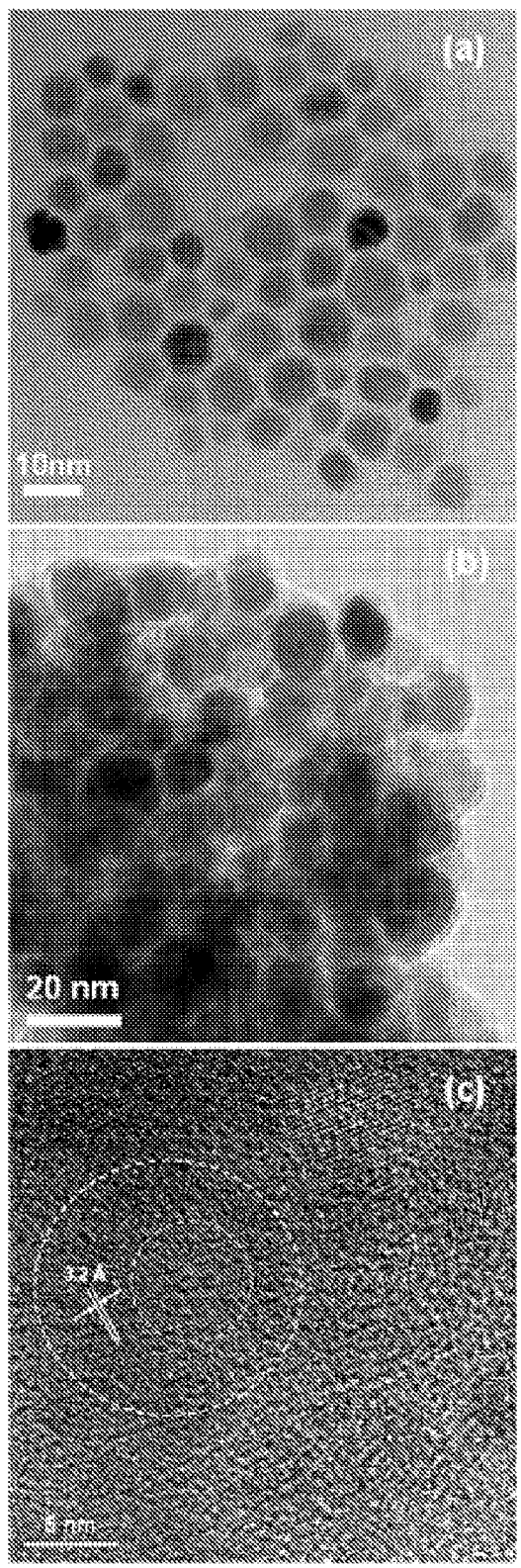
FIG. 3A is a Transmission Electron Microscopy (TEM) morphology of $Fe_3O_4$ core nanocrystals according to the present invention.
FIG. 3B is a TEM morphology of $Fe_3O_4$—$Ca_3(PO_4)_2$ core-shell nanocrystals synthesized according to the present invention.
FIG. 3C is a High Resolution Transmission Electron Microscopy (HRTEM) image of $Fe_3O_4$—$Ca_3(PO_4)_2$ core-shell nanocrystals synthesized according to the present invention.

FIG. 3A is a TEM morphology of $Fe_3O_4$ core nanocrystals according to the present invention. FIG. 3B is a TEM morphology of $Fe_3O_4$—$Ca_3(PO_4)_2$ core-shell nanocrystals synthesized according to the present invention. FIG. 3C is an HRTEM image of $Fe_3O_4$—$Ca_3(PO_4)_2$ core-shell nanocrystals synthesized according to the present invention.

That is, FIG. 3A is a TEM morphology showing high crystallinity and homogenization of $Fe_3O_4$ nanocrystals that are core crystals. FIGS. 3B and 3C are a TEM morphology and an HRTEM image of $Fe_3O_4$—$Ca_3(PO_4)_2$ core-shell nanocrystals synthesized according to the present invention. In FIG. 3C, an inner circle represents a $Fe_3O_4$ core and an outer circle represents a $Ca_3(PO_4)_2$ shell.

Figure 4:
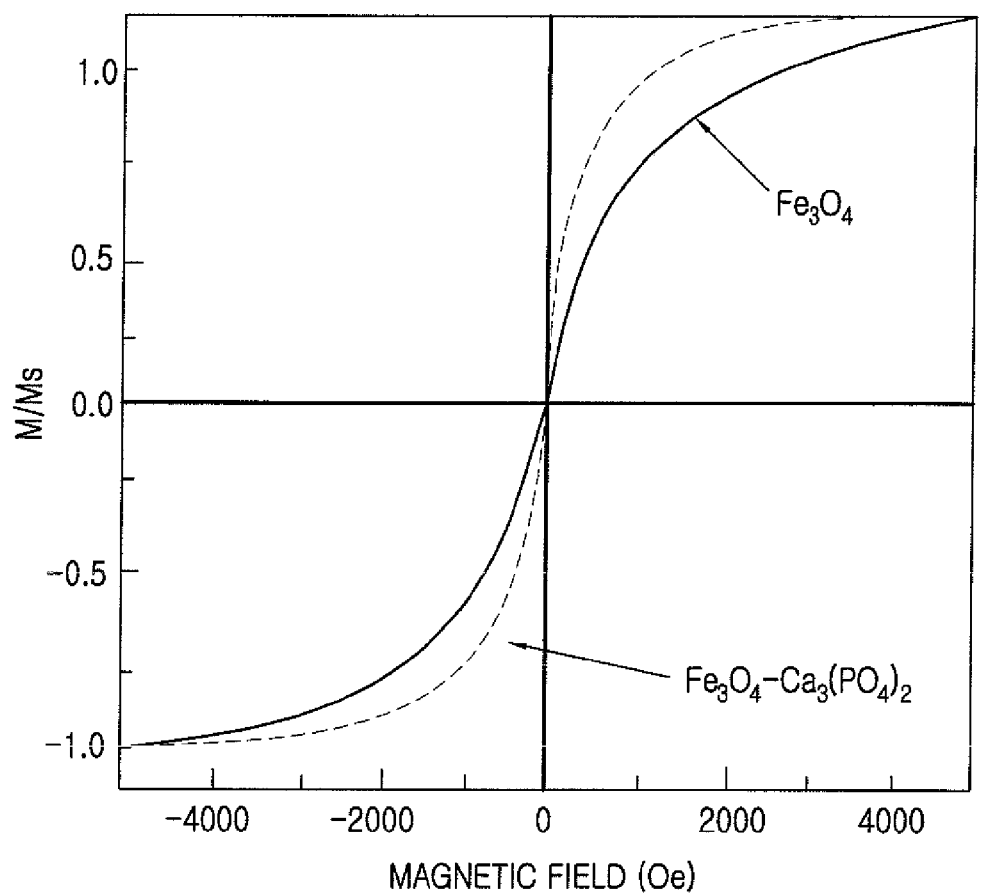
FIG. 4 is a graph illustrating hysteresis curves measured at room temperature for $Fe_3O_4$ core nanocrystals according to the present invention and $Fe_3O_4$—$Ca_3(PO_4)_2$ core-shell nanocrystals synthesized according to the present invention.

FIG. 4 is a graph illustrating hysteresis curves measured at room temperature for $Fe_3O_4$ core nanocrystals according to the present invention and $Fe_3O_4$—$Ca_3(PO_4)_2$ core-shell nanocrystals synthesized according to the present invention. A vertical axis represents a magnetization and a horizontal axis represents an intensity of the magnetic field applied. $Fe_3O_4$ nanocrystals and $Fe_3O_4$—$Ca_3(PO_4)_2$ core-shell nanocrystals synthesized according to the present invention show superparamagnetic behavior in which a coercive force value is equal to zero at room temperature. The $Fe_3O_4$—$Ca_3(PO_4)_2$ core-shell nanocrystals have a larger susceptibility compared to the $Fe_3O_4$ nanocrystals.

Figure 5:
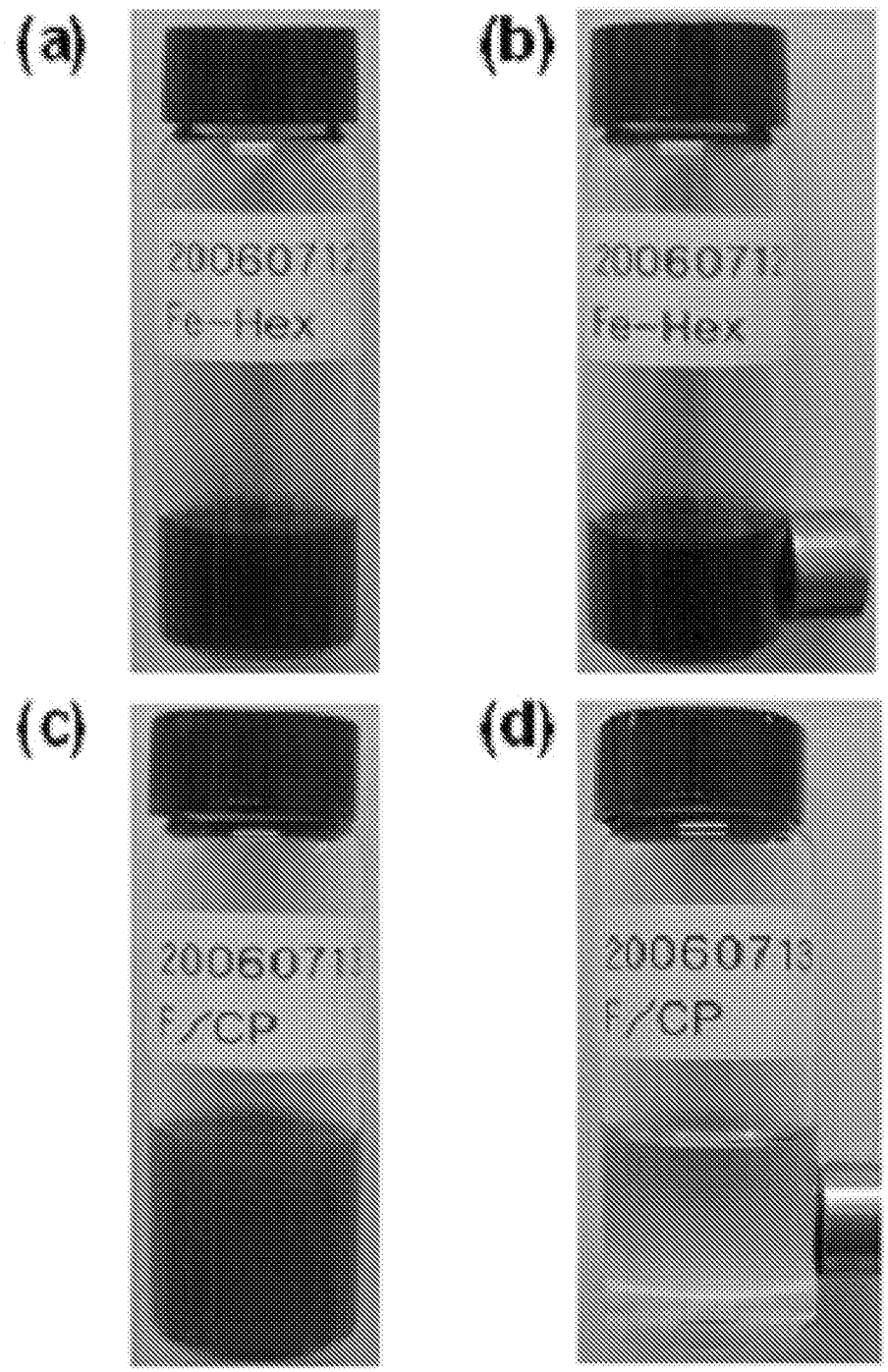
FIG. 5A is a snapshot of a solution with a dispersion of $Fe_3O_4$ core nanocrystals according to the present invention in the absence of an external magnetic field.
FIG. 5B is a snapshot of a solution with a dispersion of $Fe_3O_4$ core nanocrystals according to the present invention in the presence of an external magnetic field.
FIG. 5C is a snapshot of a solution with a dispersion of $Fe_3O_4$—$Ca_3(PO_4)_2$ core-shell nanocrystals synthesized according to the present invention in the absence of an external magnetic field.
FIG. 5D is a snapshot of a solution with a dispersion of $Fe_3O_4$—$Ca_3(PO_4)_2$ core-shell nanocrystals synthesized according to the present invention in the presence of an external magnetic field.

FIG. 5A is a snapshot of a solution with a dispersion of $Fe_3O_4$ core nanocrystals according to the present invention in the absence of an external magnetic field. FIG. 5B is a snapshot of the solution with the dispersion of the $Fe_3O_4$ core nanocrystals in the presence of the external magnetic field. FIG. 5C is a snapshot of a solution with a dispersion of $Fe_3O_4$—$Ca_3(PO_4)_2$ core-shell nanocrystals synthesized according to the present invention in the absence of the external magnetic field. FIG. 5D is a snapshot of the solution with the dispersion of the $Fe_3O_4$—$Ca_3(PO_4)_2$ core-shell nanocrystals in the presence of the external magnetic field.

TABLE 1

| 2θ(°) | Spacing (measured)(Å) | Indexing (hcp) | Spacing (calculated)(Å) | Differential spacing (Å) |
|---|---|---|---|---|
| 23.74 | 3.745 | 110 | 3.745 | 0.000 |
| 27.52 | 3.238 | 200 | 3.243 | −0.005 |
| 29.10 | 3.066 | 201 | 3.070 | −0.004 |
| 30.18 | 2.959 | 112 | 2.945 | 0.014 |
| 35.96 | 2.495 | 210 | 2.452 | 0.044 |
| 43.42 | 2.082 | 301 | 2.109 | −0.026 |
| 54.34 | 1.687 | 312 | 1.683 | 0.004 |
| 57.12 | 1.611 | 400 | 1.622 | −0.010 |
| 63.04 | 1.473 | 222 | 1.472 | 0.001 |

Table 1 shows data on a comparison between a lattice spacing measured from X-ray data on $Fe_3O_4$—$Ca_3(PO_4)_2$ core-shell nanocrystals synthesized according to the present invention and a lattice spacing theoretically calculated from a dense hexagonal phase structure. From Table 1, it can be appreciated that the $Fe_3O_4$—$Ca_3(PO_4)_2$ core-shell nanocrystals have the dense hexagonal phase structure.

According to the present invention, magnetite core-calcium phosphate shell nanocrystals can be synthesized using a polyol preparation method. In a synthesizing method of the present invention, magnetite seeds corresponding to cores are formed by the reduction of magnetite precursors and then, sequentially, the magnetite is coated with $Ca_3(PO_4)_2$ by the reduction of $Ca_3(PO_4)_2$ precursors. The manufactured magnetic core-ceramic shell structure has high crystallization degree, uniform size, and high chemical stability.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method for manufacturing bifunctional magnetic core-ceramic shell nanocrystals in a sequential process, the method comprising:
   mixing magnetic core material precursors with a reducing agent for the core material precursors;
   mixing the magnetic core material precursors and the reducing agent with an organic solvent for the magnetic core material precursors and the reducing agent and with a surfactant Poly(Ethylene Oxide)-Poly(Propylene Oxide)-Poly(Ethylene Oxide) (PEO-PPO-PEO) and forming a first mixture solution;
   heating the first mixture solution to a first temperature above 200° C. and maintaining the first mixture solution for a first time;
   cooling the first mixture solution to room temperature and forming magnetic core materials;
   mixing the magnetic core materials with ceramic shell material precursors and a reducing agent for the ceramic shell material precursors and forming a second mixture solution;
   heating the second mixture solution to a second temperature and maintaining the second mixture solution for a second time; and
   cooling the second mixture solution to room temperature and coating the magnetic core materials with the ceramic shell materials,
   wherein the core is $Fe_3O_4$ and the shell is $Ca_3(PO_4)_2$.

2. The method of claim 1, further comprising:
   precipitating the bifunctional nanocrystals by the addition of ethanol and performing separation using a centrifugal separator.

3. The method of claim 1, further comprising:
   after maintaining the first mixture solution at the first temperature for a predetermined time, heating the first mixture solution to a third temperature higher than the first temperature and maintaining the first mixture solution for a third time.

4. The method of claim 1, further comprising:
   after maintaining the second mixture solution at the second temperature for a predetermined time, heating the second mixture solution to a fourth temperature higher than the second temperature and maintaining the second mixture solution for a fourth time.

5. A method for manufacturing bifunctional magnetic core-ceramic shell nanocrystals in a sequential process, the method comprising:
   mixing $Fe_3O_4$ precursor, $Fe^{III}(acac)_3$, with a reducing agent for the $Fe_3O_4$ precursor;
   mixing the $Fe_3O_4$ precursor and the reducing agent with dioctyl ether, an organic solvent, and with a surfactant Poly(Ethylene Oxide)-Poly(Propylene Oxide)-Poly(Ethylene Oxide) (PEO-PPO-PEO) and forming a first mixture solution;
   heating the first mixture solution to about 300° C. and maintaining the first mixture solution for 1 to 2 hours;
   cooling the first mixture solution to room temperature and forming $Fe_3O_4$ cores;
   mixing the $Fe_3O_4$ cores with calcium acetate, ammonium phosphate, and reducing agents for the $Fe_3O_4$ cores, calcium acetate and ammonium phosphate and forming a second mixture solution;
   heating the second mixture solution to 80° C. and maintaining the second mixture solution for 30 minutes; and cooling the second mixture solution to room temperature and coating the $Fe_3O_4$ cores with the ceramic shells, wherein the shells are $Ca_3(PO_4)_2$.

6. The method of claim 5, further comprising:
precipitating the bifunctional nanocrystals by the addition of ethanol and performing separation using a centrifugal separator.

* * * * *